United States Patent
Yoakum et al.

(10) Patent No.: US 9,699,121 B2
(45) Date of Patent: Jul. 4, 2017

(54) INSTANT TEXT MESSAGE CONDUCTOR

(71) Applicant: Avaya Inc., Santa Clara, CA (US)

(72) Inventors: John H. Yoakum, Cary, NC (US);
Jeffrey D. Hodson, San Jose, CA (US);
Tony McCormack, Barna (IE)

(73) Assignee: Avaya Inc., Santa Clara, CA (US)

( * ) Notice: Subject to any disclaimer, the term of this patent is extended or adjusted under 35 U.S.C. 154(b) by 255 days.

(21) Appl. No.: 14/697,787

(22) Filed: Apr. 28, 2015

(65) Prior Publication Data

US 2016/0323210 A1  Nov. 3, 2016

(51) Int. Cl.
*G06F 15/16* (2006.01)
*H04L 12/58* (2006.01)
*H04L 29/08* (2006.01)

(52) U.S. Cl.
CPC ........ *H04L 51/04* (2013.01); *H04L 29/08639* (2013.01); *H04L 51/16* (2013.01); *H04L 67/148* (2013.01)

(58) Field of Classification Search
CPC .......... H04L 12/1813; H04L 12/581–12/5815; H04L 29/08639; H04L 29/08684; H04L 51/04–51/053; H04L 51/14; H04L 51/16; H04L 67/14; H04L 67/148; G06Q 30/0281
See application file for complete search history.

(56) References Cited

U.S. PATENT DOCUMENTS

| 2004/0203664 A1* | 10/2004 | Lei ........................ H04M 3/53 455/414.1 |
| 2007/0003029 A1* | 1/2007 | Vesterinen ........... G06Q 10/107 379/88.14 |
| 2007/0005703 A1* | 1/2007 | Vesterinen ............ H04L 12/581 709/206 |

OTHER PUBLICATIONS

Author Unknown, "CarcodeSMS—Allow customers to text your dealership," Edmunds.com, 2015, date accessed: Dec. 1, 2015, 6 pages, https://www.carcodesms.com/#how-it-works.

* cited by examiner

*Primary Examiner* — Brendan Higa
(74) *Attorney, Agent, or Firm* — Sheridan Ross P.C.

(57) ABSTRACT

An instant text message conductor is provided. A server device receives an instant text message from a user entity. The instant text message is addressed to a conductor entity. It is determined that a previous instant text message from the user entity was sent to a first potential responder entity. The instant text message is sent to the first potential responder entity. The server device determines that no response to the instant text message will be received from the first potential responder entity within a first period of time. A second potential responder entity is selected from a predetermined set of potential responder entities. The previous instant text message, a first response instant text message sent by the first potential responder entity in response to the previous instant text message, and the current instant text message are sent to the second potential responder entity.

21 Claims, 6 Drawing Sheets

INSTANT TEXT MESSAGE CONDUCTOR

TECHNICAL FIELD

The embodiments relate generally to asynchronous messaging and, in particular, to an intelligent instant text message conductor that conducts asynchronous message conversations between a user and different responders.

BACKGROUND

Telephone call centers are well-known mechanisms by which an individual can reliably receive support or help by calling a particular phone number. Telephone call centers can provide on-demand customer support and maintain records of calls and the subject matter of such calls such that subsequent calls by the same user, even if handled by another agent, can have continuity. Individuals, however, increasingly rely on asynchronous messaging systems, such as short message service (SMS) (i.e., text messaging), or instant messaging, to communicate, rather than traditional phone calls. Asynchronous messaging, however, does not lend itself to a call center paradigm. While services exist that allow a user to send an asynchronous message to a central number and receive an answer from an agent, there is no mechanism to ensure the same agent will respond to subsequent asynchronous messages from the same user or, if a second agent responds to a subsequent asynchronous message from the same user, any mechanism to provide the context of the previous conversation to the second agent.

SUMMARY

The embodiments relate to an instant text message conductor that conducts asynchronous message conversations between a user and different responders. The embodiments facilitate asynchronous message conversations between a user and multiple responders that provide continuity of the conversation to each subsequent responder that participates in the asynchronous message conversation.

In one embodiment, a method is provided. The method includes receiving, by a server device, an instant text message from a user entity. The instant text message is addressed to a conductor entity. It is determined that a previous instant text message from the user entity was sent to a first potential responder entity of a predetermined set of potential responder entities. The instant text message is sent to the first potential responder entity. The server device determines that no response to the instant text message will be received from the first potential responder entity within a first period of time. A second potential responder entity is selected from the predetermined set of potential responder entities. The previous instant text message, a first response instant text message sent by the first potential responder entity in response to the previous instant text message, and the current instant text message are sent to the second potential responder entity. In this manner, continuity of the instant text message conversation is maintained by providing the second potential responder entity the previous instant text message communications associated with the instant text message conversation.

In one embodiment, selecting the second potential responder entity from the predetermined set of potential responder entities includes accessing a list that identifies the predetermined set of potential responder entities. The list has a sequential order, and the second potential responder entity is next in the sequential order.

In another embodiment, selecting the second potential responder entity from the predetermined set of potential responder entities includes accessing the list that identifies the predetermined set of potential responder entities and generating a random list index. The second potential responder entity is selected based on the random list index.

In one embodiment, it is determined that a second period of time has lapsed during which no response has been received from the second potential responder entity. A third potential responder entity is selected from the predetermined set of potential responder entities. The previous instant text message, the first response instant text message sent by the first potential response device in response to the previous instant text message, and the instant text message are sent to the third potential responder entity.

In one embodiment, the second period of time differs from the first period of time.

In one embodiment, the server device receives a second response instant text message from the third potential responder entity. The second response instant text message is sent to the user entity. The second response instant text message is identified as being sent by the conductor entity. A disregard message is sent to the first potential responder entity and the second potential responder entity that directs the first potential responder entity and the second potential responder to disregard the instant text message. In some embodiments, if, after the second response instant text message has been sent to the user entity, a response instant text message is subsequently received from the first potential responder entity and/or the second potential responder entity, such response instant text message is discarded and not sent to the user entity.

In one embodiment, the server device receives, from a responder entity that is not in the predetermined set of potential responder entities, an opt-in message that requests entry into the predetermined set of potential responder entities. The predetermined set of potential responder entities is modified to include the responder entity in the predetermined set of potential responder entities.

In one embodiment, the server device receives, from a potential responder entity that is in the predetermined set of potential responder entities, an opt-out message that requests removal from the predetermined set of potential responder entities. The server device modifies the predetermined set of potential responder entities to remove the potential responder entity from the predetermined set of potential responder entities.

In one embodiment, the instant text message comprises an SMS message or an instant message.

In one embodiment, a server device is provided. The server device includes a communication interface that is configured to communicate with a network. The server device further includes a controller comprising a processor. The controller is configured to receive an instant text message from a user entity. The instant text message is addressed to a conductor entity. The controller is further configured to determine that a previous instant text message from the user entity was sent to a first potential responder entity of a predetermined set of potential responder entities. The controller is further configured to send the instant text message to the first potential responder entity. The controller is configured to determine that no response to the instant text message will be received from the first potential responder entity within a period of time. The controller is further configured to select a second potential responder entity from the predetermined set of potential responder entities. The controller is further configured to send to the second potential responder entity the previous instant text message, a first response instant text message sent by a first potential response device in response to the previous instant text message, and the instant text message.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
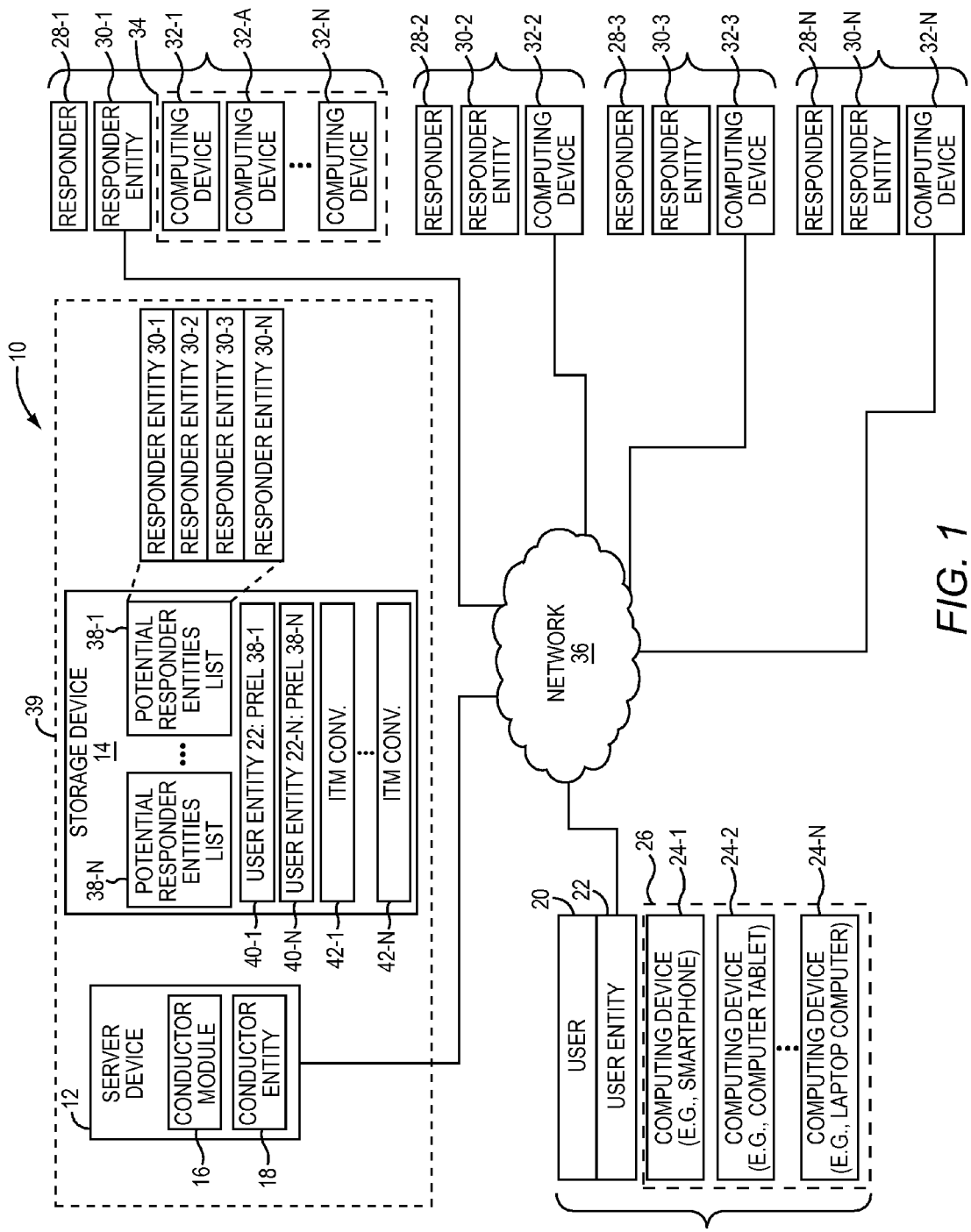
FIG. 1 is a block diagram of a system in which embodiments may be practiced.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but, unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to an instant text message conductor that conducts asynchronous message conversations between a user and different responders. The embodiments facilitate asynchronous message conversations between a user and multiple responders that provide continuity of the conversation to each subsequent responder that participates in the asynchronous message conversation.

The phrase "instant text messages" as used herein refers to asynchronous messages that are initiated from one computing device and communicated in real-time to another computing device and presented on a display of the other computing device when received by the other computing device, without user input at the other computer device. Examples of instant text messages include short message service (SMS) messages and instant messages. As used herein, an e-mail is not an instant text message because an e-mail is not conventionally automatically presented for display on the receiving device automatically without user input at the receiving device.

The phrase "user entity" as used herein is an electronic identifier that is associated with a human and is utilized to identify the human irrespective of a particular computing device that communicates an instant text message from the user entity or receives an instant text message addressed to the user entity. The user entity may comprise any electronic identifier, or set of electronic identifiers, usable by the particular system to deliver messages to and receive messages from the one or more computing devices associated with the human. By way of non-limiting example, the user entity may comprise an email address used as a form of a unique identifier, a telephone number, a username, an IP address, or the like.

The phrase "responder entity" as used herein is an electronic identifier that is associated with a human and is utilized to identify the human irrespective of a particular computing device that communicates an instant text message from the responder entity or receives an instant text message addressed to the responder entity. The responder entity may comprise any electronic identifier, or set of electronic identifiers, usable by the particular system to deliver messages to and receive messages from the one or more computing devices associated with the human. By way of non-limiting example, the responder entity may comprise an email address used as a form of a unique identifier, a telephone number, a username, an IP address, or the like.

The embodiments implement an instant text message conductor module that receives an instant text message originating from a user entity addressed to a conductor entity, accesses a list that identifies a predetermined set of potential responder entities, selects a potential responder entity through a hunting process, and forwards the instant text message to the selected potential responder entity. The instant text message may comprise textual content, audio content, and/or video content. The selected potential responder entity may respond with a response instant text message. The conductor entity receives the response instant text message and sends it to the user entity, identifying the sender of the response instant text message as the conductor entity rather than the responder entity. Among other features, the embodiments increase a likelihood that a user associated with a user entity who sends an instant text message will receive a response to the instant text message in a timely manner. During the instant text message conversation, subsequent instant text messages from the user to the conductor entity may be routed to different potential responders, along with the context of any previous communications of the user during the course of the instant text message conversation.

The embodiments have applicability in many different contexts, including, by way of non-limiting example, customer support and customer sales contexts, family support groups, open-source support communities, and the like. For purposes of illustration herein, however, the embodiments will be discussed in conjunction with an application service provider application, wherein a subscriber or user of the application service provider may designate certain potential responders as being associated with the user, such that an instant text message directed to the conductor entity may ultimately be directed to any one of the designated potential responders.

In this regard, FIG. 1 is a block diagram of a system 10 in which embodiments may be practiced. The system 10 includes a server device 12 that is communicatively coupled to, or which includes, a storage device 14. The server device 12 includes a conductor module 16 that implements certain functionality discussed herein. The conductor module 16 receives instant text messages directed, or addressed, to a conductor entity 18.

A user 20 is associated with a user entity 22. The user entity 22, as discussed above, is an electronic identifier utilized by a respective instant text messaging protocol to identify the user 20. Instant text messages sent by the user 20 are identified as originated from the user entity 22. The user entity 22 may comprise, for example, an email address, an IP address, a username, or the like. In some embodiments, the user 20 may be associated with one or more computing devices 24-1-24-N (generally, computing devices 24) of a set 26 of the computing devices 24. The computing devices 24 may comprise one or more computing devices capable of sending and receiving instant text messages, such as, by way of non-limiting example, a smartphone, a computing tablet, a laptop or desktop computer, and the like. As used herein, references to an instant text message sent by the user entity 22, or an instant text message from the user entity 22, refers to an instant text message initiated by the user 20 from a computing device 24 that identifies the instant text message as originating from the user entity 22. In some embodiments, the user 20 may initiate an instant text message from the user entity 22 using any of the computing devices 24 in the set 26 and may receive an instant text message sent from the conductor entity 18 destined for the user entity 22 at any of the computing devices 24 in the set 26.

In this example, the user 20 may designate a plurality of different responders 28-1-28-N (generally, responders 28) as potential responders that may respond to an instant text message sent by the user 20 to the conductor entity 18. For example, the user 20 may designate friends, siblings, relatives, or some other set of people as potential responders. Each responder 28 is associated with a corresponding responder entity 30-1-30-N (generally, responder entity 30). Similar to the user entity 22, a responder entity 30 is an electronic identifier that comprises an email address, an IP address, a username, or the like. The responder entity 30-1 may be associated with one or more computing devices 32-1, 32-A, 32-N (generally, computing devices 32) of a set 34 of the computing devices 32. The computing devices 32 may comprise one or more computing devices capable of sending and receiving instant text messages, such as, by way of non-limiting example, a smartphone, a computing tablet, a laptop or desktop computer, and the like. As used herein, references to an instant text message sent by the responder entity 30-1, or an instant text message from the responder entity 30-1, refers to an instant text message initiated by the responder entity 30-1 from a computing device 32 that identifies the instant text message as originating from the responder entity 30-1. In some embodiments, the responder may initiate an instant text message from the responder entity 30-1 using any of the computing devices 32 in the set 34, and may receive an instant text message sent from the conductor entity 18 destined for the responder entity 30-1 at any of the computing devices 32 in the set 34.

The discussion above with regard to the responder 28-1 applies similarly to the responders 28-2-28-N. For purposes of illustration, however, the responders 28-2-28-N will be illustrated as having corresponding single computing devices 32-2-32-N, rather than sets of computing devices 32, but it is understood that this is for purposes of simplicity only, and, in practice, each of the responders 28-2-28-N may similarly be associated with any number of computing devices 32.

In other embodiments, the designation of the potential responders 28 and associated responder entities 30 may be made by an entity that is offering or providing a service to potential users, such as the user 20. For example, in the context of a customer support application for appliances, an entity that provides customer support of appliances would designate one or more support personnel of the entity as potential responder entities 30.

The server device 12, computing devices 32, and computing devices 24 may be communicatively coupled to one another via a network 36. The network 36 may comprise any suitable network or combination of networks capable of transporting instant text messages between the computing devices 24 and the server device 12, and between the computing devices 32 and the server device 12.

The storage device 14 stores one or more potential responder entities lists 38-1-38-N. The potential responder entities list 38-1 is associated with the user entity 22 and identifies a set of potential responder entities 30. In this example, the potential responder entities list 38-1 identifies the responder entities 30-1-30-N. The potential responder entities list 38-1 may be configured directly by the user 20 or may be configured by an application service provider 39 in response to directions from the user 20. The storage device 14 may comprise hundreds or thousands of different potential responder entities lists 38 to service hundreds or thousands of different users 20. The storage device 14 also stores one or more user profiles 40-1-40-N (generally, user profiles 40). Each user profile 40 is associated with a user 20 and contains information that, for example, identifies a particular potential responder entities list 38 that is associated with the respective user 20.

The storage device 14 may also store a plurality of instant text message (ITM) conversations 42-1-42-N (generally, instant text message conversations 42). Note that the acronym ITM is used throughout the Figures for purposes of space considerations. Each instant text message conversation 42 is associated with a respective user entity 22. An instant text message conversation 42 stores each instant text message that has been sent by the respective user entity 22 to the conductor entity 18 or received from the conductor entity 18. The storage device 14 may remove an instant text message conversation 42 from the storage device 14 based on one or more criteria. The criteria may be a period of time since a previous instant text message was received from the user entity 22. For example, if no instant text message is received from the user entity 22-1 within 30 minutes, any instant text message conversation 42 associated with the user entity 22-1 may be deleted. The period of time may be a system configuration parameter or may be user-configurable and stored, for example, in the user profile 40-1.

In other embodiments, the user 20 may be able to trigger a new instant text message conversation 42 by entering a predetermined keyword in an instant text message addressed to the conductor entity 18. For example, the user 20 may initiate an instant text message from the user entity 22 that begins with the keyword "NEWITM." Upon receipt of the instant text message, the server device 12 determines if any instant text message conversations 42 are associated with the user entity 22 and, if so, removes the instant text message conversations 42 from the storage device 14 and generates a new instant text message conversation 42.

Figure 2:
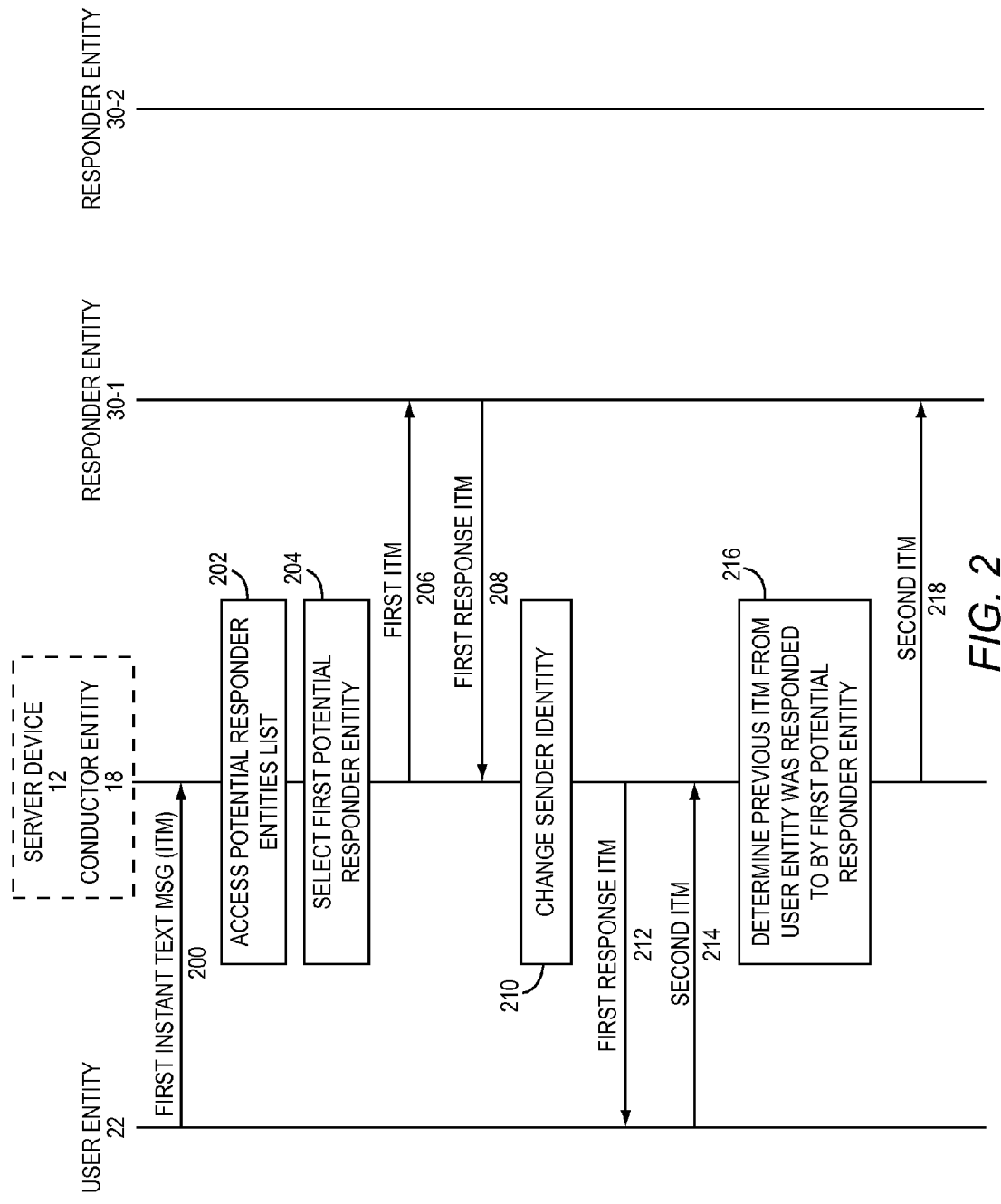
FIG. 2 is a message flow diagram illustrating an example flow of instant text messages in the system, according to one embodiment.

FIG. 2 is a message flow diagram illustrating an example flow of instant text messages in the system 10 according to one embodiment. FIG. 2 will be discussed in conjunction with FIG. 1. Assume that the user 20 determines that he or she has a problem with an appliance, such as a washing machine. The user 20, prior to this point in time, has set up the potential responder entities list 38-1 to identify a predetermined set of four responders 28-1-28-N and, for each responder 28-1-28-N, provided to the server device 12 the responder entity 30-1-30-N that is associated with the responder 28-1-28-N. The four responders 28-1-28-N may be, for example, four siblings of the user 20.

The user 20 utilizes the computing device 24-1 to initiate a first instant text message from the user entity 22 to the conductor entity 18. In particular, in this example, assume that the user 20 utilizes an instant text messaging application provided by the application service provider 39 and downloaded to the computing device 24-1. Similarly, the responders 28-1-28-N have downloaded the same instant text messaging application to respective computing devices 32-1-32-N. In other embodiments, the instant text messaging application may be browser based on a native feature of the computing device 24-1.

The instant text messaging application identifies the first instant text message as originating from the user entity 22. In this example, the user entity 22 may comprise a unique user name utilized by the instant text messaging application, such as "Sarah123." The user 20 may send the first instant text message to the conductor entity 18 by selecting a known and predetermined destination associated with the conductor entity 18, such as "Conductor." For purposes of illustration, assume that the instant text message contains the text "Help—washing machine leaking water all over the floor."

The server device 12 receives the first instant text message addressed to the conductor entity 18 from the user entity 22 (step 200). The server device 12 determines that there is no existing instant text message conversation 42 associated with the user entity 22 and generates the instant text message conversation 42-1. The server device 12 stores the first instant text message in the instant text message conversation 42-1. The server device 12 accesses the user profile 40-1 and determines that the potential responder entities list 38-1 is associated with the user entity 22. The server device 12 accesses the potential responder entity list 38-1 (block 202). The server device 12 selects the responder entity 30-1 (block 204). For purposes of this example, the responder entity 30-1 will hereinafter be referred to as the first potential responder entity 30-1. The server device 12 may have selected the first potential responder entity 30-1 from the potential responder entities list 38-1 based on any desired criteria. In one embodiment, the selection is based on sequential order, and the server device 12 selects the first potential responder entity 30-1 because the first potential responder entity 30-1 is the first potential responder entity 30 in the potential responder entity list 38-1. In another embodiment, the server device 12 generates a random list index. A random list index may be generated, for example, by invoking a random number generator. The number returned is normalized to a number that ranges from one (1) to the number of potential responder entities 30 identified in the potential responder entity list 38-1. The normalized number is then used to select the first potential responder entity 30. Those skilled in the art will recognize many potential methods of selecting a potential responder entity 30, including, by way of non-limiting example, longest idle responder wherein a last response time of each potential responder entity 30 that identifies a time since the respective potential responder entity 30 provided a response to any instant text message is maintained. The potential responder entity 30 who has least recently responded to an instant text message is selected as the potential responder entity 30. It is understood that this and all other such methods fall within the scope of the embodiments.

The server device 12 sends the first instant text message to the first responder entity 30-1 (step 206). Assume that the responder 28-1 is presented with the first instant text message on the computing device 32-1. The responder 28-1 enters a first response instant text message via the instant text messaging application executing on the computing device 32-1. For example, the responder 28-1 may enter the text "Turn off the water to the washer" and press a send button. The first response instant text message is addressed to the conductor entity 18. The server device 12 receives the first response instant text message (step 208). The server device 12 stores the first instant text message in the instant text message conversation 42-1. The server device 12 changes the sender identity from the first potential responder entity 30-1 to the conductor entity 18 (block 210). The server device 12 sends the first response instant text message to the user entity 22 (step 212). Assume that the user 20 receives the first response instant text message on the computing device 24-1. The user 20 is unaware that the first response instant text message originated from the first potential responder entity 30-1, because the first response instant text message is identified as originating from the conductor entity 18.

The user 20 responds with a second instant text message that contains the text "How do I do that?" The instant messaging application identifies the second instant text message as originating from the user entity 22 and addresses the second instant text message to the conductor entity 18. The server device 12 receives the second instant text message (step 214). The server device 12 determines that the instant text message conversation 42-1 is associated with the user entity 22 and accesses the instant text message conversation 42-1. The server device 12 stores the second instant text message in the instant text message conversation 42-1. The server device 12 determines that the previous instant text message received from the user entity 22 was responded to by the first potential responder entity 30-1 (block 216). This may be determined in any desired manner, including, by way of non-limiting example, via information contained in the instant text message conversation 42-1. The server device 12 sends the second instant text message to the first responder entity 30-1 (step 218).

Figure 3:
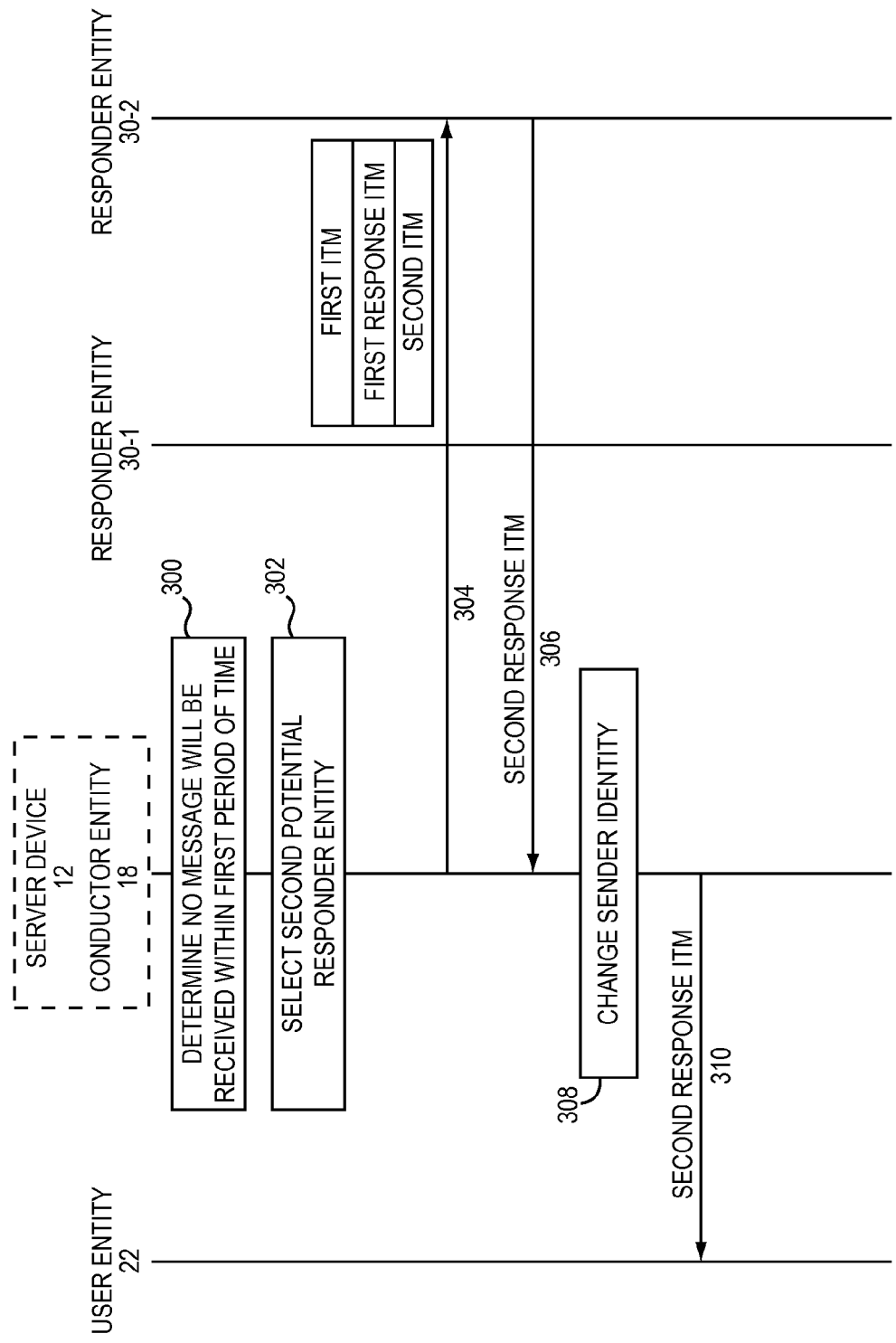
FIG. 3 is a message flow diagram illustrating one potential series of communications in the system that may follow the message flow illustrated in FIG. 2, according to one embodiment.

FIG. 3 is a message flow diagram illustrating one potential series of communications in the system 10 that may follow the message flow illustrated in FIG. 2. FIG. 3 will be discussed in conjunction with FIG. 1. Assume that the sequence of events described with regard to FIG. 3 follows that described with regard to FIG. 2. After sending the second instant text message to the first responder entity 30-1 (FIG. 2), the server device 12 determines that no response to the instant text message will be received from the first potential responder entity 30-1 within a first period of time (block 300). In one embodiment, the server device 12 may determine this after receiving a system notification that indicates the first potential responder entity 30-1 is unavailable. In another embodiment, the server device 12 may determine this by determining that the first period of time has lapsed and no response to the instant text message from the first potential responder entity 30-1 has been received. In another embodiment, the server device 12 may determine this by receiving, from the first potential responder entity 30-1, a message indicating no response to the instant text message will be provided.

The first period of time may be determined in any number of ways. In one embodiment, the user 20 may designate, via the user profile 40-1, the first period of time. For example, the user 20 may designate that the first period of time comprises 60 seconds. After sending an instant text message originating from the user entity 22, the server device 12 may access user profile information from the user profile 40-1 and extract the first period of time from the user profile information.

In another embodiment, the server device 12 may determine the first period of time based on a time of day. The server device 12 may have a list that identifies a plurality of different periods of time corresponding to different times of day. The server device 12 sets the first period of time to a period of time corresponding to the time-of-day based on the list.

In another embodiment, the first period of time may be based on a particular performance metric of the server device 12, such as current throughput, processor utilization, memory utilization, or the like. The server device 12 determines a performance metric value that quantifies the relevant performance metric of the server device 12. For example, the server device 12 determines that the processor utilization of the server device 12 is 70 percent. The server device 12 accesses a list identifying a plurality of different periods of time, each period of time corresponding to a different range of performance metric values that quantify the performance metric. The server device 12 identifies the particular period of time from the list based on the performance metric value and sets the first period of time to the particular period of time.

It will be appreciated that these are merely examples, and the period of time may be determined in any desired manner. As will be discussed herein, different periods of times may be utilized while awaiting responses from different potential responder entities 30. For example, the period of time may increase as each potential responder entity 30 in a sequence of potential responder entities 30 fails to respond. Alternatively, the period of time may decrease as each potential responder entity 30 in a sequence of potential responder entities 30 fails to respond.

The server device 12 accesses the potential responder entities list 38-1 and selects a second potential responder entity 30 (block 302). Assume that the server device 12 selects the second potential responder entity 30-2. In some embodiments, the selection process may be described herein as "hunting" as a reference to hunting for another potential responder entity 30. As discussed above, the hunting may be based on any desired mechanism, such as round-robin, random, sequential, or the like. The server device 12 accesses the instant text message conversation 42-1 and sends the second potential responder entity 30-2 the first instant text message from the user entity 22, the first response instant text message from the first potential responder entity 30-1, and the second instant text message from the user entity 22 (step 304). Thus, the responder 28-2 may receive the following: "Help—washing machine leaking water all over the floor," "Turn off the water to the washer," and "How do I do that?" The originator of each instant text message may be identified to the responder 28-2. In this manner, the responder 28-2 has the full context of the previous portions of the instant text message conversation 42-1.

The responder 28-2 sends a second response instant text message via the instant text messaging application executing on the computing device 32-2. For example, the responder 28-2 may enter the text "There should be a valve behind the washer. Turn it clockwise until it is completely off" and press a send button. The second response instant text message is addressed to the conductor entity 18. The server device 12 receives the second response instant text message (step 306). The server device 12 stores the second instant text message in the instant text message conversation 42-1. The server device 12 changes the sender identity from the second potential responder entity 30-2 to the conductor entity 18 (block 308). The server device 12 sends the second response instant text message to the user entity 22 (step 310). The user 20 receives the second response instant text message on the computing device 24-1. The user 20 is unaware that the second response instant text message originated from the second potential responder entity 30-2, because the second response instant text message is identified as originating from the conductor entity 18.

Figure 4:
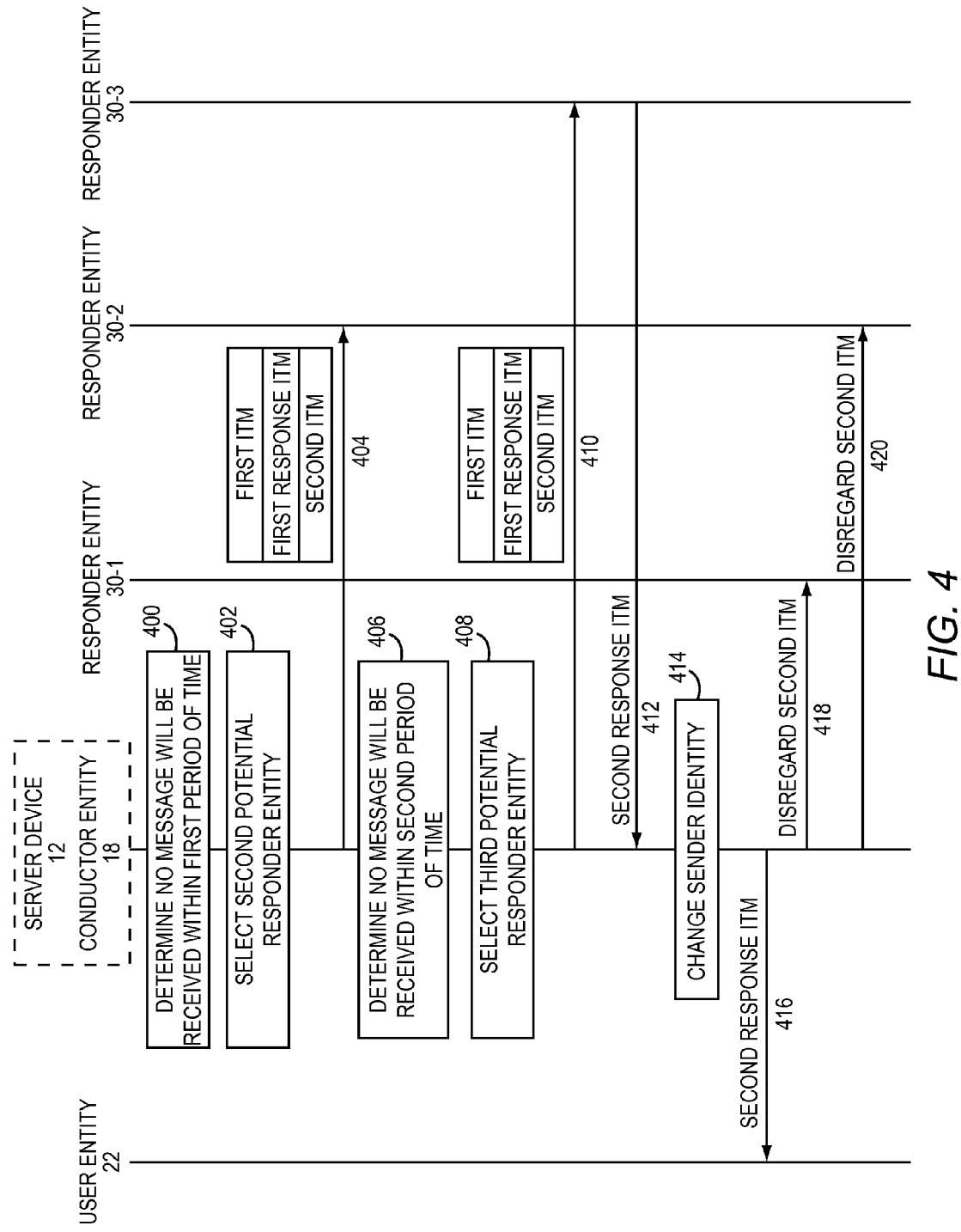
FIG. 4 is a message flow diagram illustrating another potential series of communications in the system that may follow the message flow illustrated in FIG. 2, according to another embodiment.

FIG. 4 is a message flow diagram illustrating another potential series of communications in the system 10 that may follow the message flow illustrated in FIG. 2. FIG. 4 will be discussed in conjunction with FIG. 1. Assume that the sequence of events described with regard to FIG. 4 follow those described with regard to FIG. 2. The events identified by blocks 400, 402, and 404 are identical to the events identified by respective blocks 300, 302, and 304 of FIG. 3 and will not be explained again for purposes of brevity. In this example, however, after sending the first instant text message from the user entity 22, the first response instant text message from the first potential responder entity 30-1, and the second instant text message from the user entity 22 to the second potential responder entity 30-2 (block 404), the server device 12 determines that no response to the instant text message will be received from the second potential responder entity 30-2 within a second period of time (block 406). This determination may be made similarly to that discussed above. Moreover, the second period of time may be determined in any number of ways, similar to that discussed above with regard to the first period of time. Thus, neither the first potential responder entity 30-1 nor the second potential responder entity 30-2 responded within the respective first and second periods of time. The server device 12 accesses the potential responder entities list 38-1 and selects a third potential responder entity 30 (block 408). In this example, the server device 12 selects the responder entity 30-3.

The server device 12 accesses the instant text message conversation 42-1 and sends the third potential responder entity 30-3 the first instant text message from the user entity 22, the first response instant text message from the first potential responder entity 30-1, and the second instant text message from the user entity 22 (block 410). Thus, the responder 28-3 may receive the following: "Help—washing machine leaking water all over the floor," "Turn off the water to the washer," and "How do I do that?" The originator of each instant text message may be identified to the responder 28-3. In this manner, the responder 28-3 has the full context of the previous portions of the instant text message conversation 42-1.

The responder 28-3 sends a second response instant text message via the instant text messaging application executing on the computing device 32-3. For example, the responder 28-3 may enter the text "The valve should be near the washer. Look for it. It will have a knob. Turn it off" and press a send button. The second response instant text message is addressed to the conductor entity 18. The server device 12 receives the second response instant text message (step 412). The server device 12 stores the second response instant text message in the instant text message conversation 42-1. The server device 12 changes the sender identity from the third potential responder entity 30-3 to the conductor entity 18 (block 414). The server device 12 sends the second response instant text message to the user entity 22 (step 416). The user 20 receives the second response instant text message on the computing device 24-1. The user 20 is unaware that the second response instant text message originated from the third potential responder entity 30-3, because the second response instant text message is identified as originating from the conductor entity 18.

The server device 12 sends a disregard message to the first potential responder entity 30-1 and the second potential responder entity 30-2 that directs the first potential responder entity 30-1 and the second potential responder entity 30-2 to disregard the second instant text message (steps 418, 420). In this manner, when the responders 28-1, 28-2 ultimately read the second instant text message sent by the user entity 22, the responders 28-1, 28-2 will recognize that the second instant text message has been handled by another responder 28. In other embodiments, the server device 12 may send the disregard message to each previous potential responder entity 30 as a next potential responder entity 30 is attempted.

In some embodiments, a current state of the potential responder entities list 38-1 may be altered based on input received from a responder entity 30. For example, the server device 12 may receive from a responder entity 30 that is not currently in the potential responder entities list 38-1 an opt-in message that requests entry into the potential responder entities list 38-1. The server device 12 modifies the potential responder entities list 38-1 to include the responder entity 30 in the potential responder entities list 38-1. In some embodiments, the population of responder entities 30 that may seek inclusion into the potential responder entities list 38-1 may be identified in the user profile 40-1, or elsewhere.

Similarly, the server device 12 may receive from a potential responder entity 30 that is in the potential responder entities list 38-1 an opt-out message that requests removal from the potential responder entities list 38-1. The server device 12 modifies the potential responder entities list 38-1 to remove the potential responder entity 30 from the potential responder entities list 38-1.

In another embodiment, the server device 12 receives from a potential responder entity 30 that is in the potential responder entities list 38-1, an opt-out message that requests removal from the potential responder entities list 38-1 for a specified period of time. The server device 12 modifies the potential responder entities list 38-1 to remove the potential responder entity 30 from the potential responder entities list 38-1. Subsequently, the server device 12 determines that the specified period of time has lapsed and modifies the potential responder entities list 38-1 to include the potential responder entity 30 in the potential responder entities list 38-1.

In some embodiments, a plurality of different potential responder entities lists 38 may be generated, as well as a preferred processing order of such potential responder entities lists 38. Thus, if all the potential responder entities 30 identified in a first potential responder entities list 38 have not responded within respective periods of time, the server device 12 accesses a second potential responder entities list 38 that has been designated and begins processing the potential responder entities 30 in such second potential responder entities list 38, as described above.

Figure 5:
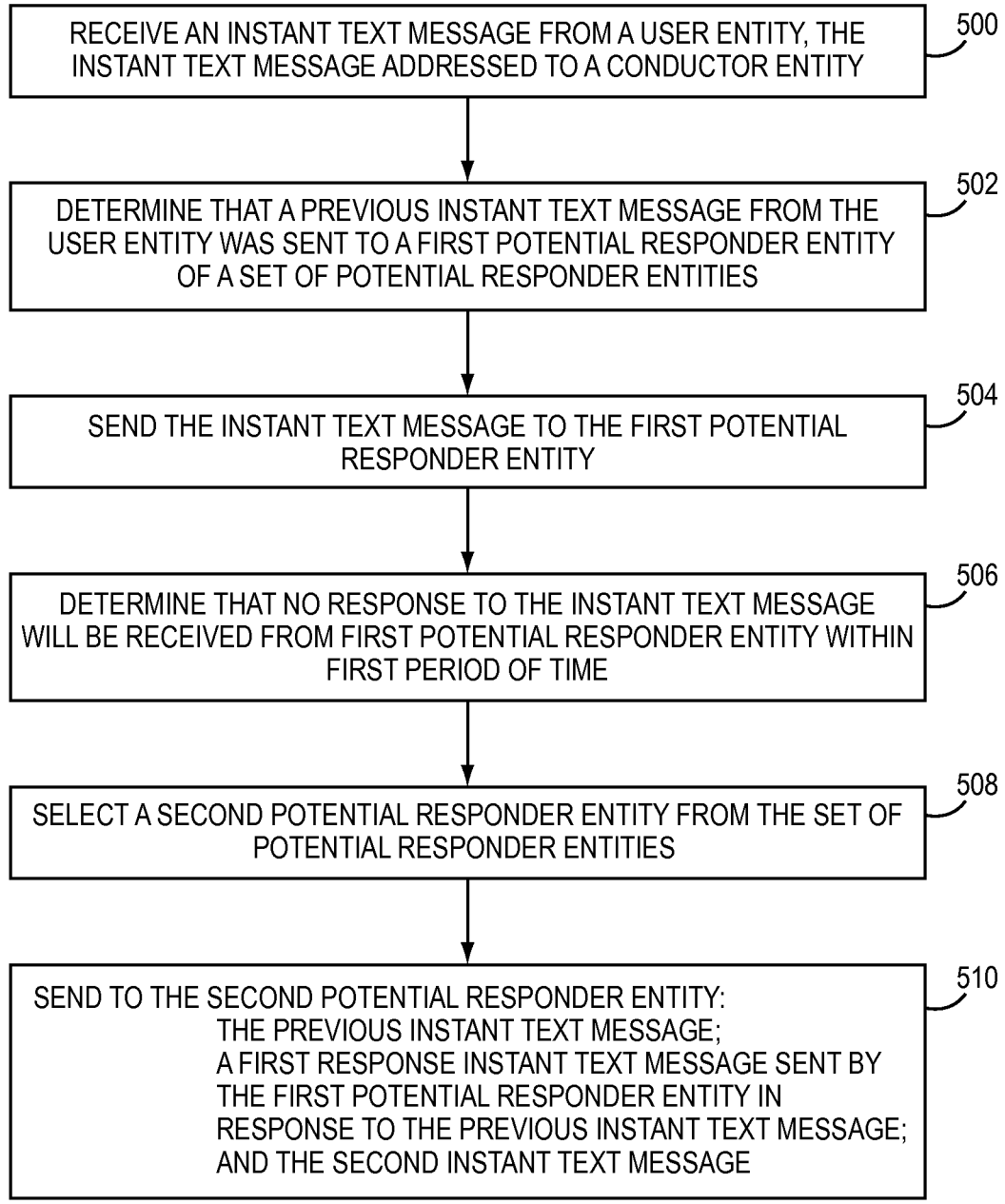
FIG. 5 is a flowchart of a method for conducting an instant text messaging conversation, according to one embodiment.

FIG. 5 is a flowchart of a method for conducting an instant text message conversation 42 according to one embodiment. FIG. 5 will be discussed in conjunction with FIG. 1. The server device 12 receives an instant text message from the user entity 22 that is addressed to the conductor entity 18 (block 500). The server device 12 accesses the instant text message conversation 42-1 and determines that a previous instant text message from the user entity 22 was sent to the first potential responder entity 30-1 of the set of potential responder entities 30 identified in the potential responder entities list 38-1 (block 502). The server device 12 sends the previous instant text message to the first potential responder entity 30-1 (block 504). The server device 12 determines that no response to the instant text message will be received from the first potential responder entity 30-1 within a first period of time (block 506). The server device 12 selects a second potential responder entity 30-2 from the set of potential responder entities 30 identified in the potential responder entities list 38-1 (block 508). The server device 12 sends, to the second potential responder entity 30-2, the previous instant text message, a first response instant text message sent by the first potential responder entity in response to the previous instant text message, and the instant text message (block 510).

Figure 6:
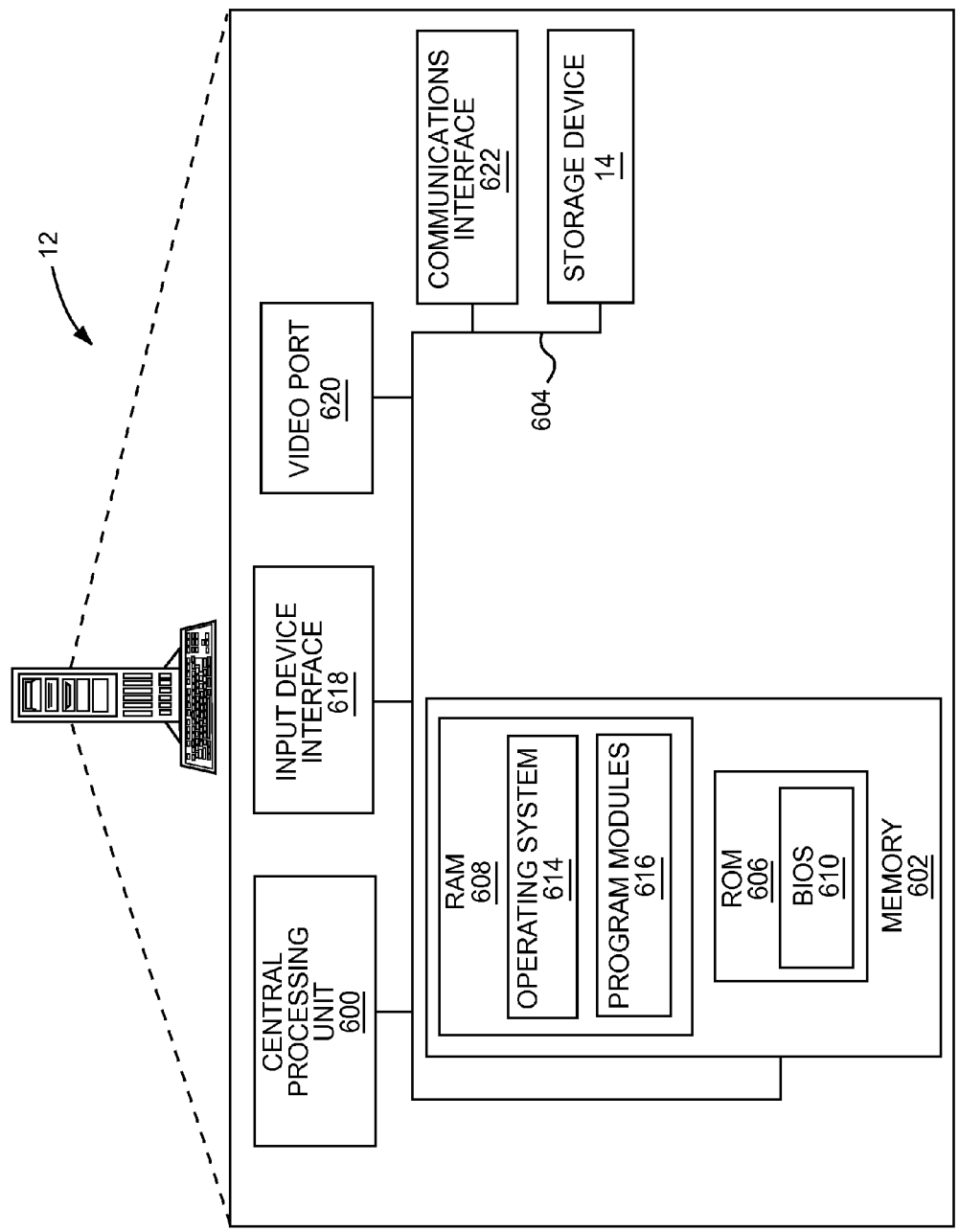
FIG. 6 is a block diagram of a server device, according to one embodiment.

FIG. 6 is a block diagram of the server device 12 according to one embodiment. The server device 12 may comprise any computing or processing device capable of implementing the functionality described herein, such as a server computer, desktop computer, communications switch, or the like. The server device 12 includes a central processing unit 600, a system memory 602, and a system bus 604. The system bus 604 provides an interface for system components including, but not limited to, the system memory 602 and the central processing unit 600. The central processing unit 600 can be any commercially available or proprietary processor.

The system bus 604 may be any of several types of bus structures that may further interconnect to a memory bus (with or without a memory controller), a peripheral bus, and/or a local bus using any of a variety of commercially available bus architectures. The system memory 602 may include non-volatile memory 606 (e.g., read-only memory (ROM), erasable programmable read-only memory (EPROM), electrically erasable programmable read-only memory (EEPROM), etc.) and/or volatile memory 608 (e.g., random-access memory (RAM)). A basic input/output system (BIOS) 610 may be stored in the non-volatile memory 606 and can include the basic routines that help to transfer information between elements within the server device 12. The volatile memory 608 may also include a high-speed RAM, such as static RAM for caching data.

The server device 12 may further include or be coupled to the computer-readable storage device 14, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage device 14 and other drives associated with computer-readable media and computer-usable media may provide non-volatile storage of data, data structures, computer-executable instructions, and the like. Although the description of computer-readable media above refers to an HDD, it should be appreciated by those skilled in the art that other types of media that are readable by a computer, such as Zip disks, magnetic cassettes, flash memory cards, cartridges, and the like, may also be used in the exemplary operating environment and, further, that any such media may contain computer-executable instructions for performing novel methods of the disclosed architecture.

A number of modules can be stored in the computer-readable storage device 14 and in the volatile memory 608, including an operating system 614 and one or more program modules 616, which may implement the functionality described herein in whole or in part, including, for example, the conductor module 16. It is to be appreciated that the embodiments can be implemented with various commercially available operating systems 614 or combinations of operating systems 614.

All or a portion of the embodiments may be implemented as a computer program product stored on a transitory or non-transitory computer-usable or computer-readable storage medium, such as the computer-readable storage device 14, which includes complex programming instructions, such as complex computer-readable program code, configured to cause the central processing unit 600 to carry out the steps described herein. Thus, the computer-readable program code can comprise software instructions for implementing the functionality of the embodiments described herein when executed on the central processing unit 600. The central processing unit 600, in conjunction with the program modules 616 in the volatile memory 608, may serve as a controller for the server device 12 that is configured to, or adapted to, implement the functionality described herein.

An operator may be able to enter one or more configuration commands through a keyboard (not illustrated), a pointing device such as a mouse (not illustrated), or a touch-sensitive surface (not illustrated). Such input devices may be connected to the central processing unit 600 through an input device interface 618 that is coupled to the system bus 604 but can be connected by other interfaces such as a parallel port, an Institute of Electrical and Electronic Engineers (IEEE) 1394 serial port, a Universal Serial Bus (USB) port, an IR interface, and the like.

The server device 12 may also include the communication interface 622, suitable for communicating with the network 36 and other networks as appropriate or desired. The server device 12 may also include a video port 620 configured to interface with a display.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
    receiving, by a server device, an instant text message from a user entity, the instant text message addressed to a conductor entity;
    determining that a previous instant text message from the user entity was sent to a first potential responder entity of a predetermined set of potential responder entities;
    sending the instant text message to the first potential responder entity;
    determining, by the server device, that no response to the instant text message will be received from the first potential responder entity within a first period of time;
    selecting a second potential responder entity from the predetermined set of potential responder entities; and
    sending, to the second potential responder entity:
        the previous instant text message;
        a first response instant text message sent by the first potential responder entity in response to the previous instant text message; and
        the instant text message.

2. The method of claim 1, wherein selecting the second potential responder entity from the predetermined set of potential responder entities comprises:
    accessing a list that identifies the predetermined set of potential responder entities, the list having a sequential order; and
    determining that the second potential responder entity is next in the sequential order.

3. The method of claim 1, wherein selecting the second potential responder entity from the predetermined set of potential responder entities comprises:
    accessing a list that identifies the predetermined set of potential responder entities;
    generating a random list index;
    selecting the second potential responder entity based on the random list index.

4. The method of claim 1, further comprising:
    determining, by the server device, that a second period of time has lapsed during which no response has been received from the second potential responder entity;
    selecting a third potential responder entity from the predetermined set of potential responder entities; and
    sending, to the third potential responder entity:
        the previous instant text message;
        the first response instant text message sent by the first potential responder entity in response to the previous instant text message; and
        the instant text message.

5. The method of claim 4, wherein the second period of time differs from the first period of time.

6. The method of claim 4, wherein the second period of time is greater than the first period of time.

7. The method of claim 4, wherein the second period of time is less than the first period of time.

8. The method of claim 4, further comprising:
    receiving, by the server device, a second response instant text message from the third potential responder entity;
    sending the second response instant text message to the user entity, the second response instant text message identified as being sent by the conductor entity;
    sending a disregard message to the first potential responder entity and the second potential responder entity that directs the first potential responder entity and the second potential responder entity to disregard the instant text message.

9. The method of claim 1, further comprising:
    receiving, by the server device, from a responder entity that is not in the predetermined set of potential responder entities, an opt-in message that requests entry into the predetermined set of potential responder entities; and
    modifying the predetermined set of potential responder entities to include the responder entity in the predetermined set of potential responder entities.

10. The method of claim 1, further comprising:
    receiving, by the server device, from a potential responder entity that is in the predetermined set of potential responder entities, an opt-out message that requests removal from the predetermined set of potential responder entities; and
    modifying the predetermined set of potential responder entities to remove the potential responder entity from the predetermined set of potential responder entities.

11. The method of claim 1, further comprising:
    receiving, by the server device, from a potential responder entity that is in the predetermined set of potential responder entities, an opt-out message that requests removal from the predetermined set of potential responder entities for a specified period of time;

modifying the predetermined set of potential responder entities to remove the potential responder entity from the predetermined set of potential responder entities;
determining that the specified period of time has lapsed; and
modifying the predetermined set of potential responder entities to include the potential responder entity in the predetermined set of potential responder entities.

12. The method of claim 1, wherein the instant text message comprises an SMS message or an instant message.

13. The method of claim 1, further comprising:
accessing user profile information associated with the user entity; and
extracting the first period of time from the user profile information.

14. The method of claim 1, further comprising:
determining a time of day;
accessing a list identifying a plurality of different periods of time corresponding to different times of day; and
setting the first period of time to a period of time corresponding to the time of day.

15. The method of claim 1, further comprising:
determining a performance metric value that quantifies a performance metric of the server device;
accessing a list identifying a plurality of different periods of time, each period of time of the plurality of different periods of time corresponding to a different range of performance metric values that quantify the performance metric;
identifying a particular period of time from the list based on the performance metric value; and
setting the first period of time to the particular period of time.

16. The method of claim 1, wherein determining, by the server device, that no response to the instant text message will be received from the first potential responder entity within the first period of time comprises receiving a system notification that indicates the first potential responder entity is unavailable.

17. The method of claim 1, wherein determining, by the server device, that no response to the instant text message will be received from the first potential responder entity within the first period of time comprises:
determining that the first period of time has lapsed; and
determining that no response to the instant text message from the first potential responder entity has been received.

18. The method of claim 1, wherein determining, by the server device, that no response to the instant text message will be received from the first potential responder entity within the first period of time comprises:
receiving, from the first potential responder entity, a message indicating that no response to the instant text message will be provided.

19. The method of claim 1, wherein selecting the second potential responder entity from the predetermined set of potential responder entities comprises:
determining a last response time for each respective potential responder entity in the predetermined set of potential responder entities, the last response time identifying a time since the respective potential responder entity provided a response to any instant text message; and
selecting the second potential responder entity based on which potential responder entity has least recently responded to any instant text message.

20. A server device, comprising:
a communication interface configured to communicate with a network; and
a controller comprising a processor, the controller configured to:
receive an instant text message from a user entity, the instant text message addressed to a conductor entity;
determine that a previous instant text message from the user entity was sent to a first potential responder entity of a predetermined set of potential responder entities;
send the instant text message to the first potential responder entity;
determine that no response to the instant text message will be received from the first potential responder entity within a first period of time;
select a second potential responder entity from the predetermined set of potential responder entities; and
send, to the second potential responder entity:
the previous instant text message;
a first response instant text message sent by a first potential responder entity in response to the previous instant text message; and
the instant text message.

21. A method, comprising:
receiving, by a server device comprising a processor, at a first time, a first instant text message from a user entity, the first instant text message addressed to a conductor entity;
accessing, by the server device, a list identifying a predetermined set of potential responder entities;
selecting, by the server device, a first potential responder entity of the predetermined set of potential responder entities;
communicating the first instant text message to the first potential responder entity;
receiving, by the server device, a first response instant text message from the first potential responder entity;
sending the first response instant text message to the user entity, the first response instant text message identified as being sent by the conductor entity;
receiving a second instant text message from the user entity;
sending the second instant text message to the first potential responder entity;
determining that no response to the instant text message will be received from the first potential responder entity within a period of time;
selecting, by the server device, a second potential responder entity of the predetermined set of potential responder entities; and
sending, to the second potential responder entity:
the first instant text message;
the first response instant text message; and
the second instant text message.

* * * * *